Figure 1:
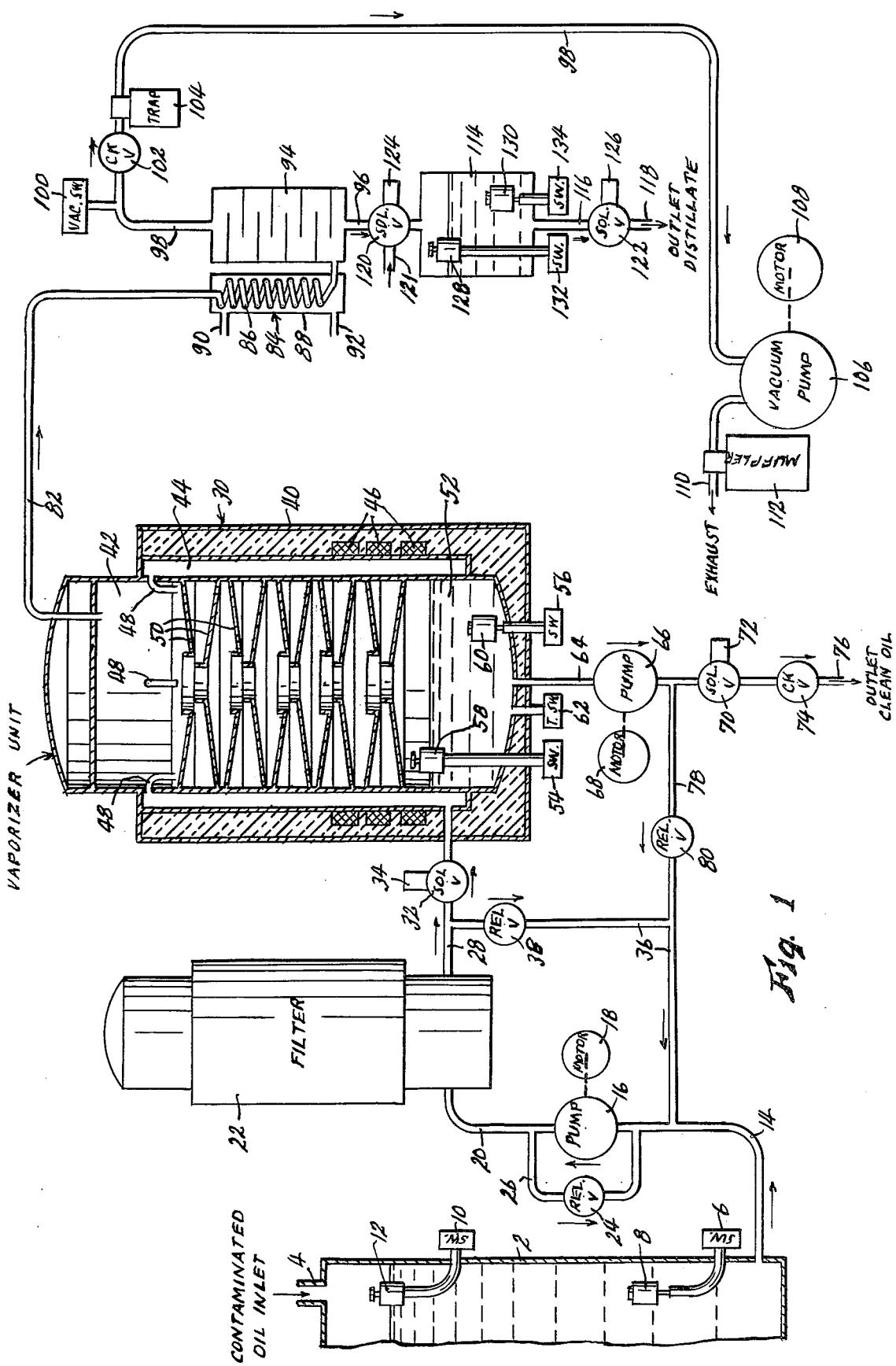

United States Patent [19]

Williams

[11] 4,089,662
[45] May 16, 1978

[54] OIL TREATMENT SYSTEM

[75] Inventor: Marvin R. Williams, Springfield, Mo.

[73] Assignee: Allen Filters, Inc., Springfield, Mo.

[21] Appl. No.: 808,896

[22] Filed: Jun. 22, 1977

[51] Int. Cl.$^2$ ............................................. B01D 1/22
[52] U.S. Cl. ...................................... 55/166; 55/169;
    55/175; 55/186; 196/98; 196/132; 210/104
[58] Field of Search ..................... 55/42, 43, 160, 176,
    55/186, 187, 166, 169; 210/104; 196/98, 121,
    132

[56] References Cited

U.S. PATENT DOCUMENTS

| | | | |
|---|---|---|---|
| 1,749,571 | 3/1930 | Dilworth et al. | 196/98 |
| 1,864,095 | 6/1932 | Rodman et al. | 55/186 X |
| 1,953,013 | 3/1934 | Gray | 196/132 X |
| 3,932,150 | 1/1976 | Komai et al. | 55/160 |

Primary Examiner—John Adee
Attorney, Agent, or Firm—John A. Hamilton

[57] ABSTRACT

An oil treatment system for reclaiming used oil including apparatus for feeding the oil first through a filter for removing solid contaminants therefrom then through a vaporizer unit wherein it is heated under a vacuum while in a flowing film form to remove water, dissolved gases and volatile contaminants therefrom, and automatic control devices whereby treated oil cannot be discharged until it has been subjected to heat and vacuum in the necessary degrees, and whereby the system, once initiated by a starting or stopping signal, is automated to initiate or terminate operation of the various components of the system in a sequence operable to produce efficient, trouble-free operation of the system as a whole.

10 Claims, 2 Drawing Figures

OIL TREATMENT SYSTEM

This invention relates to new and useful improvements in systems for treating used oil to reclaim it for further use. Examples of used oil requiring such treatment are oils used in lubricating systems, hydraulic systems, transformers, circuit breakers, compressors, turbines and engines. Such oils may be of the natural mineral type, synthetic or semi-synthetic.

It is of course well known to filter such oils to remove solid, non-soluble contaminants therefrom. It is also known to pass such oils through vaporizer units in which they are heated under a vacuum to drive off dissolved gases, water and volatile contaminants therefrom. The vacuum assists in the vaporization process by lowering the vaporization temperatures, and also carries the gaseous products of the vaporizer away from the treated oil for disposal.

However, since the vaporizer contains a vacuum, the oil must be pumped both to and from said vaporizer, and this creates certain problems of proper sequencing of the inlet, outlet and vacuum pumps. The outlet pump cannot be allowed to start until its intake is submerged with oil by the inlet pump, otherwise it will suck air instead of oil, and cavitation resulting in possible damage to the outlet pump will occur. Therefore the inlet pump must operate for a period of time before the outlet pump can be allowed to start. The vacuum pump should not be allowed to start until the outlet pump has operated for a period of time sufficient to bleed air bubbles from the system. Such air bubbles are particularly likely to be present in the vaporizer well during start-up of the system, and if the vacuum is applied immediately, it will act on the bubbles to inhibit free flow of oil to the outlet pump, and hence again tend to cause cavitation in said pump. Accordingly, an object of the present invention is the provision of automated controls providing the desired starting sequence of the inlet, outlet and vacuum pumps without attention from the human operator.

Another common defect of such oil treatment systems has been that heretofore there has been no means for insuring that oil emerging from the system outlet has in fact been subjected to temperature and vacuum sufficiently high to insure the best possible removal of water, dissolved gases and volatile contaminants therefrom. The temperature to which oil entering the vaporizer will be elevated by a heater of any given capacity will vary widely with the entry temperature of the oil, and the degree of vacuum which will be produced by a vacuum pump of any given capacity will vary widely with the volume of vaporized gases produced in the vaporizer, which in turn is a function of the volume of vaporizable contaminants contained in the entering oil. Accordingly, another object of the present invention is the provision of automatic controls whereby treated oil cannot be discharged from the system until it has in fact been subjected to the desired degrees of both temperature and vacuum. These controls divert the oil for recycling through both the filter and the vaporizer until the desired conditions of temperature and vacuum have been attained.

Components of the water vapor and gases drawn from the oil in the vaporizer are cooled and condensed to liquid form, and must be disposed of. Heretofore, this disposal has required either the use of a tank in the vacuum line for collecting the distillate, of sufficiently high capacity to require emptying only in normal shutdown periods of the system, or shutting down the system whenever drainage of the distillate tank is required, since drainage of the tank breaks the system vacuum. Either alternative is inconvenient, tedious, and possibly expensive. Accordingly, a further object of the present invention is the provision of automatic controls functioning to drain the distillate tank periodically, whenever required, without breaking the system vacuum.

Other objects are simplicity and economy of construction, and efficiency and dependability of operation.

Figure 2:
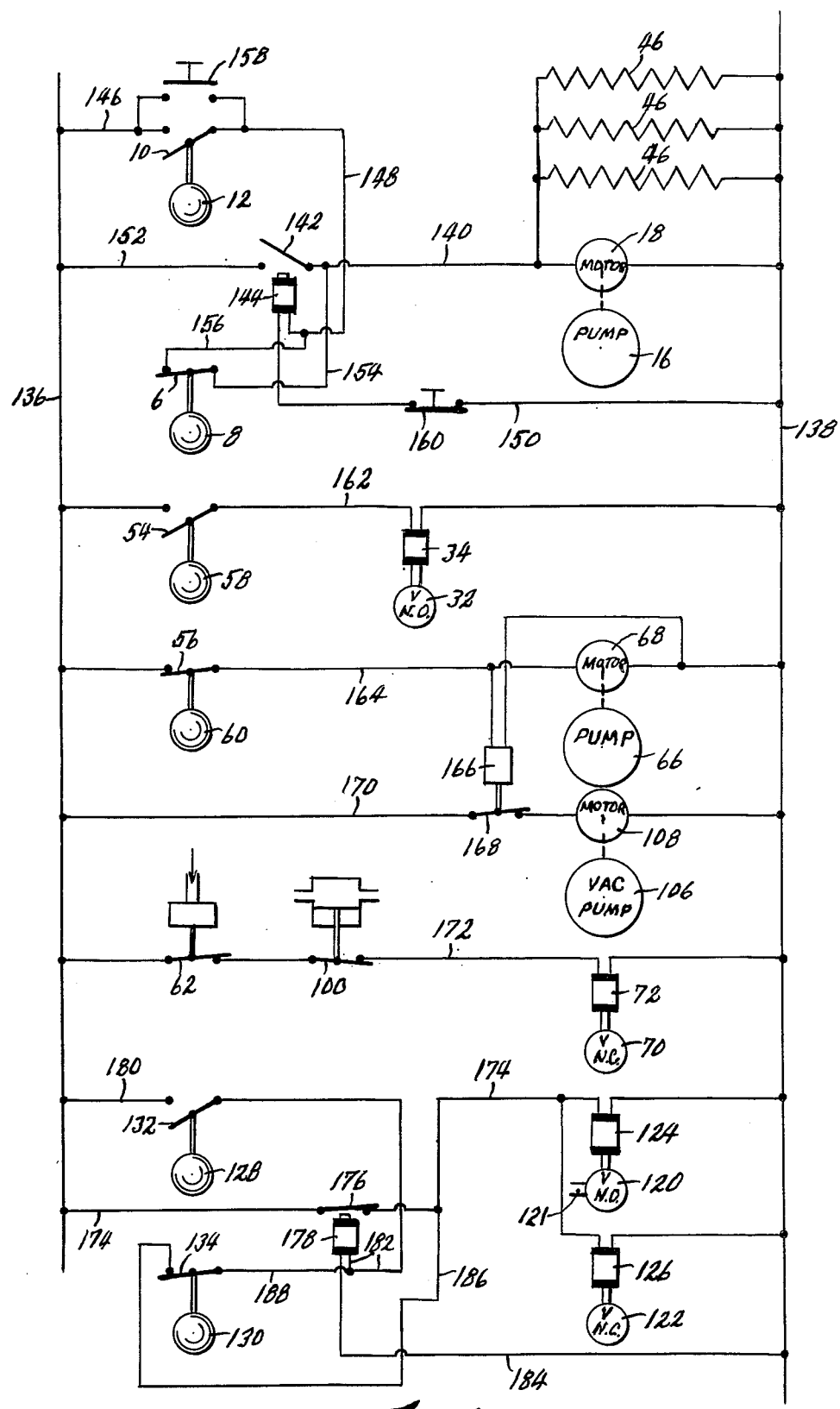

With these objects in view, as well as other objects which will appear in the course of the specification, reference will be had to the accompanying drawing, wherein:

FIG. 1 is a schematic diagram of an oil treatment system embodying the present invention, and FIG. 2 is a schematic wiring diagram of the system.

Like reference numerals apply to similar parts throughout the drawing, and referring first to FIG. 1, the numeral 2 applies to a receiving tank into which contaminated oil from any desired source is deposited through inlet 4. Said tank is equipped with a lower, normally-open float switch 6, operable to be closed by elevation of a float 8 disposed within the tank whenever the oil level within the tank rises to the level of the float, and an upper, normally-open float switch 10 operable to be closed by elevation of a float 12 disposed within the tank whenever the oil level within the tank rises to the level of float 12. Each of these float switches, as well as the four other float switches incorporated in the system, may be of a type wherein the float is vertically movable on a hollow sleeve, and carries a magnet operable to open or close a switch disposed within the sleeve.

Oil is drawn from the lower portion of tank 2 through conduit 14 by a positive displacement pump 16 operable by an electric motor 18, and delivered by said pump through a conduit 20 to the inlet of an oil filter 22. A pressure relief valve 24 set to open at a pressure sufficiently low to protect pump 16 against overloading, but high enough to deliver oil through the filter to the vaporizer unit, as will appear, is interposed in a by-pass conduit 26 around pump 16. Filter 22 may be of any suitable design, its particular and specific structure not being pertinent to the present invention. Its function is of course to remove solid, particulate contaminants from the oil. The filtered oil, still under the pressure of pump 16, is delivered from the filter through a conduit 28 to a vaporizer unit indicated generally by the numeral 30. Interposed in conduit 28 is a normally open solenoid valve 32 operable to be closed by energization of its solenoid 34. A conduit 36 interconnects the suction side of pump 16 with conduit 28 upstream from valve 32, and a pressure relief valve 38, set to open at a pressure sufficiently low to prevent overloading of pump 16 when valve 32 is closed, is interposed in conduit 36.

Vaporizer unit 30 may be of any suitable type to accomplish its desired function of heating the oil under a vacuum while in the form of a thin film to drive off any air or gases dissolved in the oil, to vaporize any water or volatile contaminants contained in the oil, and to draw off the expelled gases and vapors by means of said vacuum. As shown, it consists of a sealed vertically cylindrical insulated housing 40 including an inner chamber 42 surrounded by an annular jacket chamber 44 into the lower portion of which the filtered oil is directed by conduit 28. The oil then rises through chamber 44, wherein it is pre-heated by electric heater elements 46, and is discharged from the top of chamber 44 through spouts 48 into inner chamber 42 to the topmost of a vertically stacked series of trays 50 disposed within chamber 42. The trays are alternately upwardly and downwardly conical, and each is provided at its lower peripheral edge portion with apertures for draining oil to the upper peripheral edge portion of the next lower tray. The oil thus moves successively downwardly over the trays in the form of a flowing film, while being further heated, and as will appear, being subjected to a vacuum. Thus dissolved gases, volatile vapors and water are driven from the oil, and are drawn off by the vacuum as will be described, the gases and vapors rising through a column provided by central apertures of the trays. Oil, now completely clean, "dry" and ready for re-use, drains from the lowermost tray into a well 52 in the lowermost portion of the housing. Said well is equipped with a pair of float switches 54 and 56 similar in all pertinent respects to switches 6 and 10, being normally open, and operable respectively by floats 58 and 60 to close respectively at maximum and minimum allowable oil levels in the well. A temperature-sensitive electrical switch 62 responsive to the temperature of the oil in well 52 is normally open, but closes when the well temperature is sufficiently high to insure full vaporization of the gases and volatile contaminants in the oil.

The treated oil is drawn from the bottom of well 52 through a conduit 64 in which are interposed, in series, a positive-displacement pump 66 operable by an electric motor 68, a normally closed solenoid valve 70 operable to be opened by energization of its solenoid 72, and a check valve 74. The treated oil exits from the system at outlet 76. Intermediate pump 66 and solenoid valve 70, a conduit 78 is interconnected into conduit 64, and connects to the suction side of inlet pump 16 through conduit 36. Interposed in conduit 78 is a pressure relief valve 80 which is operable to open at a pressure sufficiently low to prevent overloading of pump 66 whenever solenoid valve 70 is closed.

Vapors and gases expelled from the oil in vaporizer unit 30 are drawn from the top of housing 40 through a vacuum conduit 82 to a heat exchanger unit 84 wherein they are cooled to condense the vapors carried thereby by circulation thereof through a coil 86 disposed in a water jacket 88 through which water is circulated through water connections 90 and 92. The gases then pass upwardly through a baffled condensor chamber 94, the distilled liquids passing downwardly to drain conduit 96 for disposal in a manner to be described, and the gases being drawn by the vacuum upwardly to a top outlet conduit 98 of the condensor. Interposed in conduit 98 is a vacuum-sensitive electric switch 100 which is normally open, but closes whenever the vacuum is sufficiently high to insure efficient removal of all gases and vapors produced in vaporizer unit 30. Also interposed in conduit 98, in series, are a check valve 102 operable to prevent reverse flow, a moisture trap 104 operable to trap any slight amount of liquids which may escape condensor 94, and vacuum pump 106 driven by an electric motor 108. The vacuum pump is provided with an exhaust conduit 110 to atmosphere, in which is interposed a muffler 112 for dampening the operating noise of the pump.

The distilled liquids draining through drain conduit 96 of condensor 94 flow by gravity into a distillate tank 114, and from said tank through a conduit 116 to an outlet 118 for disposal in any suitable manner. Interposed in conduits 96 and 116, respectively above and below the distillate tank, are a pair of solenoid valves 120 and 122, valve 120 being normally open but operable to be closed by energization of its solenoid 124, and valve 122 being normally closed but operable to be opened by energization of its solenoid 126. Valve 120 is also provided with an atmospheric vent 121 which is closed whenever said valve is opened to interconnect condensor 94 and distillate tank 114, but opens to vent tank 114 to atmosphere whenever said valve is closed. Also carried in the distillate tank are a pair of floats 128 and 130, operable respectively to close a pair of float-actuated switches 132 and 134 respectively at maximum and minimum allowable liquid levels in the tank, in the same manner as switches 6 and 10 of the receiving tank, or switches 54 and 56 of the vaporizer unit.

The wiring diagram of the system is shown in FIG. 2, as a ladder diagram between electric line wires 136 and 138. Electric heater elements 46 and motor 18 of inlet pump 16 are connected in parallel across the line wires by wire 140 in which is interposed a normally open relay 142 operable to be closed by energization of its coil 144. Said coil is energized by a circuit from line wire 136 through wire 146, top float switch 10 of receiving tank 2, wire 148, coil 144, and wire 150 to wire 138, whereby relay 142 is closed. Closure of the relay also completes a holding circuit from wire 136 through wire 152, relay 142, wires 140 and 154, lower float switch 6 of the receiving tank, wires 156 and 148, coil 144 and wire 150 to wire 138. A normally open pushbutton switch 158 by-passes switch 10, and a normally closed pushbutton switch 160 is interposed in wire 150. The solenoid 34 of valve 32 is connected across the line wires by wire 162, in which the upper float switch 54 of the well 52 of the vaporizer unit is interposed. The motor 68 of outlet pump 66 is connected across the line wires by wire 164, in which the lower float switch 56 of the vaporizer is interposed. Connected in parallel with motor 68, and also controlled by switch 56, is a time-delay device 166 which operates, a predetermined time after switch 56 is closed, to close a normally open switch 168 interposed in a wire 170, which connects motor 108 of vacuum pump 106 across the line wires. The solenoid 72 of solenoid valve 70 is connected across the line wires by wire 172 in which both temperature-sensitive switch 62 and vacuum-sensitive switch 100 are connected in series, so that valve 70 cannot open unless both of said switches are closed. The solenoid valves 120 and 122 are connected in parallel across the line wires by a wire 174 in which is interposed a normally open relay 176 operable to be closed by energization of its coil 178. Said coil is energized by a circuit extending wire 136 through wire 180, top float switch 132 of the distillate tank, wire 182, coil 178 and wire 184 to wire 138. Closure of relay 176 also completes a holding circuit from wire 136 through wire 174, relay 176, wire 186, bottom float switch 134 of the distillate tank, wires 188 and 182, coil 178 and wire 184 to wire 138.

In operation, it will be seen that start-up of the system is signalled by closure of the top float switch 10 of receiving tank 2, indicating that the tank is full. Closure of switch 10 closes relay 142, thereby actuating inlet pump 16 and heater elements 46, and also completing the relay holding circuit including bottom float switch 6 of the holding tank, so that pump 16 remains in operation until the oil level in tank 2 is drawn down to the level of bottom float switch 6, which will then interrupt the holding circuit to deactivate pump 16. The system may also be activated by momentary closure of pushbutton switch 158, in the event start-up is desired before tank 2 is filled, and may be stopped by momentary opening of pushbutton switch 160 to interrupt the holding circuit in the event stoppage is desired before tank 2 is empty.

Pump 16, whenever actuated, draws oil from tank 2 and delivers it through conduit 20 to filter 22, wherein solid contaminants contained in the oil are removed. The filter may be of any suitable type, the details thereof not being considered pertinent to the present invention. In the event the filter should become clogged, the back pressure on the pump 16 will increase, and pressure relief valve 24 will open to protect the pump against overloading. Oil leaving filter 22, still driven by pump 16, passes through conduit 28 and solenoid valve 32 (normally open) to vaporizer as previously described. It is heated by heaters 46 (now energized) and flows downwardly over the successive trays 50 in the form of a film, whereby dissolved gases and volatiles which are vaporizable at temperatures less than the vaporization temperature of the oil itself will be removed from the oil in the form of gas and vapor when the oil temperature and vacuum are at sufficiently high levels. The oil passing downward over trays 50 collects in well 52, and when the oil level therein rises to a sufficiently high level to insure that outlet pump 66 will, when actuated, be sucking oil, not air, the oil elevates float 60 of lower float switch 56 to close said switch. This activates outlet pump 66, and also energizes time delay unit 166, which after a delay of perhaps one or two minutes, closes switch 168 to activate vacuum pump 106. This delay is desirable since the oil initially entering well 52 may contain large quantities of air bubbles, either from filter 22 or because of the still inadequate heating of the oil. If the vacuum were applied as soon as pump 66 were energized it could act on the bubbles to interfere with the flow of oil to pump 66, and therefore cause cavitation in the operation of the pump. The delay in the application of the vacuum gives pump 66 time to draw off and bleed the air bubbles from the system before the vacuum is applied thereby avoiding cavitation of the pump. If the oil level in well 52 rises for any reason to or above the level shown in FIG. 1, above which it could submerge some of trays 50 and thus interfere with efficient operation of the vaporizer, it elevates float 58 of upper float switch 54 of the well, whereby to close said switch to activate solenoid 34 of valve 32 to close said valve. Oil from the filter is thereby diverted through relief valve 38, back to the suction side of inlet pump 16, until outlet pump 66 can again draw the oil in the well down to a satisfactory level, at which time valve 32 will again open. Actually, the variation of the oil level in well 52 should be as small as is practically possible. This provides a well balanced system not only by maintaining a nearly constant liquid volume, but also by providing enough flexibility to compensate for pressure variations from vaporizable fluids in the vaporizer.

Initially, oil delivered to pump 66 may not be fully cleansed of all vaporizable contaminants, first because it may not initially be heated fully to the required temperature because the vaporizer unit is not as yet fully preheated, and second because an insufficient vacuum has been developed to assist in the vaporization and remove the vapors. This vacuum deficiency may occur due to the time lag in starting the vacuum pump which is introduced by time-delay unit 166. The temperature and vacuum deficiencies may also occur at any time in the operation of the system, for example if the oil entering the vaporizer should be very cold, or should contain excessive amounts of water or other vaporizable contaminants beyond the removal capacity of the vacuum pump. Solenoid valve 70 is utilized to prevent dischage of possibly still contaminated oil at outlet 76. This valve is normally closed, diverting the discharge of pump 66 back to the suction side of inlet pump 16 for recycling, unless and until the oil temperature in well 52 is sufficiently high to guarantee full vaporization of the vaporizable contaminants of the oil, whereby to close switch 62, and unless and until the vacuum is at sufficiently high level to guarantee removal of the vapors, whereby to close switch 100. When both switches 52 and 100 are closed, they complete the operating circuit of solenoid 72 of valve 70 to open said valve, and fully treated oil is delivered at outlet 76. The conditions of optimum temperature and vacuum must both be met before any treated oil can be discharged.

Distillate removal from the vacuum line by heat exchanger 84 and condenser 94 drains through valve 120, which is normally open, and collects in distillate tank 114, since discharge valve 122 is normally closed, until the distillate level in the tank rises to the level of float 128 of float switch 132, whereupon said switch closes relay 176 to complete the operating circuits of solenoids 124 and 126 to close valve 120 and open valve 122. Closure of switch 132 also completes the holding circuit of relay 176 through bottom float switch 134 of the distillate tank. The distillate then drains through valve 122 for disposal, without breaking the vacuum in the vaporizer, until the level in tank 114 drops to float 130 of lower float switch 134 to open said switch. This interrupts the holding circuit to allow valves 120 and 122 to return to their normal positions to allow gradual refilling of the tank. Thus the distillate is automatically and periodically removed from the system with no necessity that the system be shut down for this purpose. The opening of vent 121 when valve 120 is closed breaks any vacuum which might tend to form in the top of tank 114 and hence promotes rapid drainage through valve 122.

Whenever shut-down of the system is signalled, either by the opening of switch 6, indicating that receiving tank 2 is nearly empty, or manually by the depression of pushbutton 160, inlet pump 16 and heater elements 46 are deactivated first. Outlet pump 66 and vacuum pump 106 continue to operate until the oil level in vaporizer well 52 is drawn down sufficiently to open lower float switch 56 of the well, which deactivates pumps 66 and 106, and the system comes to rest. This sequence permits the withdrawal for use of most of the treated oil present in well 52 at the time shutdown of the system is signalled.

Thus it will be apparent that an oil treatment system having several advantages has been produced. Its central feature is considered to be the provision of temperature-sensitive switch 62, vacuum-sensitive switch 100 and valve 70, which together with related elements insure as closely as possible that only fully "clean and dry" oil, from which the water, dissolved gases and volatile contaminants have been fully removed, can ever be discharged from outlet 76. With the type of vaporizer shown, it provides automatically for the sequence of starting, and stopping, the inlet pump, heater elements, outlet pump and vacuum pump which is most conductive to efficient operation, and which will prevent cavitation in the outlet pump, which is highly subject to this type of malfunction. It provides for automatic periodic removal of the distillate removed from the oil with no necessity of shutting the system down to do so.

While I have shown and described a specific system for carrying out the objects of this invention, it will be readily apparent that many minor changes of structure and operation could be made without departing from the spirit of the invention.

What I claim as new and desire to protect by Letters Patent is:

1. An oil treatment system including:
   a. an oil vaporizer unit including a sealed housing,
   b. delivery means operable to deliver contaminated oil having water, dissolved gases and/or volatile contaminants contained therein to said vaporizer housing,
   c. heater means operable to heat said oil within said housing, whereby said water, gases and volatile contaminants are driven from said oil in gaseous form,
   d. vacuum means operable to create a vacuum within said housing to assist in the removal of said contaminants from said oil and to draw off the gaseous contaminants driven from said oil,
   e. exhaust means operable to draw the treated oil from said housing to an outlet,
   f. diversion means operable when activated to divert the exhausted oil from said outlet and back to the inlet of said housing, and
   g. temperature-sensitive control means operable to deactivate said diversion means only when the temperature of the oil leaving said housing has been elevated to a sufficiently high temperature to insure substantially complete removal of all water, dissolved gases and volatile contaminants therefrom.

2. A system as recited in claim 1 with the addition of a vacuum-sensitive control operable responsively to the vacuum created in said housing to deactivate said diversion means only when said vacuum is at a sufficiently high level to insure substantially complete removal of all gaseous contaminants removed from the oil in said housing.

3. A system as recited in claim 2 wherein said delivery means comprises a first pump operable to deliver oil from a contaminated source through a first conduit to said vaporizer housing, wherein said exhaust means comprises a second pump operable to draw treated oil from said housing and deliver it through a second conduit to said outlet, and wherein said diversion means comprises:
   a. a normally closed diversion valve in said second conduit downstream from said second pump,
   b. a by-pass conduit interconnecting said second conduit, intermediate said second pump and said diversion valve, with said first conduit upstream from said first pump,
   c. a pressure relief valve interposed in said by-pass concuit and operable to open at a pressure less than that representing an overloading of said second pump, and
   d. valve operating means operable responsively to said temperature-sensitive means and to said vacuum-sensitive means to open said diversion valve only when both the associated temperature and vacuum have risen to the required levels.

4. A system as recited in claim 3 with the addition of a filter unit interposed in said first conduit intermediate said first pump and said vaporizer housing, and operable to remove solid contaminants from the oil before said oil reaches said vaporizer housing.

5. A system as recited in claim 3 wherein said vaporizer unit comprises a series of vertically spaced apart trays disposed in said housing above a bottom well of said housing, whereby oil directed into the top of said housing by said first pump drains successively downwardly over said trays as it is heated by said heater means, and drains from the lowermost of said trays to said well, from which it is drawn by said second pump.

6. A system as recited in claim 5 with the addition of a float-controlled device operable responsively to the level of the oil delivered to said well by said first pump to actuate said second pump only when the oil level in said well has risen sufficiently to submerge the intake of said second pump, whereby said second pump does not suck air, and to deactivate said second pump whenever the oil level in said well falls below said level.

7. A system as recited in claim 6 wherein said vacuum means includes a vacuum pump connected to the upper portion of said vaporizer housing by a conduit, and exhausting to atmosphere, and with the addition of control means operable responsively to the activation of said second pump to activate said vacuum pump after a pre-determined time delay, whereby said second pump may purge air bubbles from said well before said vacuum pump is activated.

8. A system as recited in claim 5 with the addition of a filter unit interposed in said first conduit intermediate said first pump and said vaporizer housing, and with the addition of a second diversion means comprising:
   a. a by-pass conduit interconnected into said first conduit respectively upstream from said first pump and intermediate said filter and said vaporizer housing,
   b. a pressure relief valve interposed in said by-pass conduit and operable to open at a pressure less than a pressure representing overloading of said first pump,
   c. a normally-open valve in said first conduit intermediate said by-pass conduit and said vaporizer housing, and
   d. a float-operated control operable responsively to the oil level in said vaporizer well to close said valve whenever said oil level exceeds a pre-determined maximum.

9. A system as recited in claim 2 wherein said vacuum means includes a vacuum pump having its suction line connected into said vaporizer housing, and exhausting to atmosphere, and with the addition of:
   a. a condenser interposed in said vacuum line and operable to condense vapors contained in the gases drawn from said vaporizer housing to liquid distillate form,
   b. a distillate tank having its inlet connected to said condenser to receive said distillate, and through the outlet of which said distillate may be drained, and
   c. a pair of valves disposed respectively at the inlet and outlet of said distillate tank, whereby by opening and closing said valves in proper sequence, distillate may be drained from said tank without interrupting the vacuum in said vacuum line.

10. A system as recited in claim 9 with the addition of a float-operated control system for said distillate tank valves, said control system being operable responsively to the distillate level in said tank to close said inlet valve and open said outlet valve when said distillate reaches a pre-determined higher level, and to open said inlet valve and close said outlet valve when said distillate falls to a pre-determined lower level.

* * * * *